Figure 1:
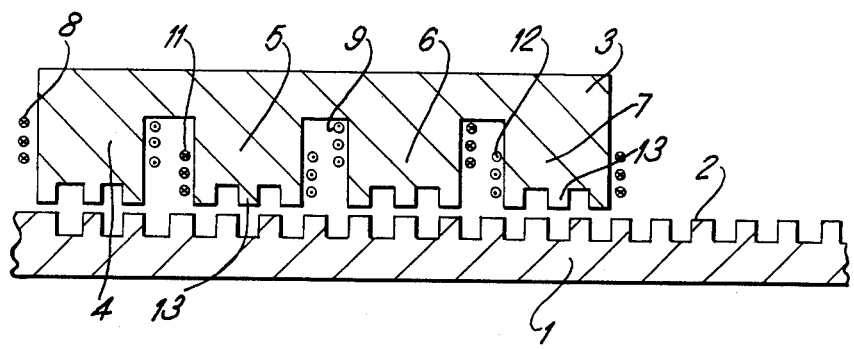

United States Patent [19]
McLean et al.

[11] 4,114,060
[45] Sep. 12, 1978

[54] ELECTRIC MOTOR

[75] Inventors: Graham Wilson McLean, Lymm; David Holt, Stapleford, both of England

[73] Assignee: Strathearn Audio Limited, Belfast, Northern Ireland

[21] Appl. No.: 797,252

[22] Filed: May 16, 1977

Related U.S. Application Data

[63] Continuation of Ser. No. 601,438, Aug. 1, 1975, abandoned.

[30] Foreign Application Priority Data

May 16, 1977 [GB] United Kingdom ............... 34153/77

[51] Int. Cl.$^2$ ............................................. H02K 19/14
[52] U.S. Cl. ....................................... 310/163; 310/12
[58] Field of Search ...................................... 310/12–14, 310/41, 162–165; 318/135, 37

[56] References Cited

U.S. PATENT DOCUMENTS

| | | | |
|---|---|---|---|
| 1,495,827 | 5/1924 | Warren | 310/163 |
| 1,708,334 | 4/1929 | Spencer | 310/163 |

*Primary Examiner*—Donovan F. Duggan
*Attorney, Agent, or Firm*—Cushman, Darby & Cushman

[57] ABSTRACT

An electric motor, particularly for driving a gramophone, a tape recorder or an electric instrument at a low rotational speed whereby an induction effect is utilized to achieve good starting torque and a reluctance effect to give good torque when the motor is locked in and running synchronously. The motor includes a stator assembly with a first plurality of pairs of primary pole pieces each pair constituted by a first metal part for the energization by an in-phase current and a second plurality of pairs of primary pole pieces each pair constituted by a second metal part for energization by an out of phase current. The respective parts also define slots constituting secondary pole pieces. A rotor assembly defines a plurality of further pole pieces having a pitch corresponding to the pitch of the secondary pieces, so that when the secondary pieces associated with the first plurality are opposite to the respective ones of the further pole pieces the secondary pole pieces associated with the second plurality of pieces are displaced with respect to respective ones of the further pole pieces by the phase angle between in-phase and out-of-phase currents.

6 Claims, 2 Drawing Figures

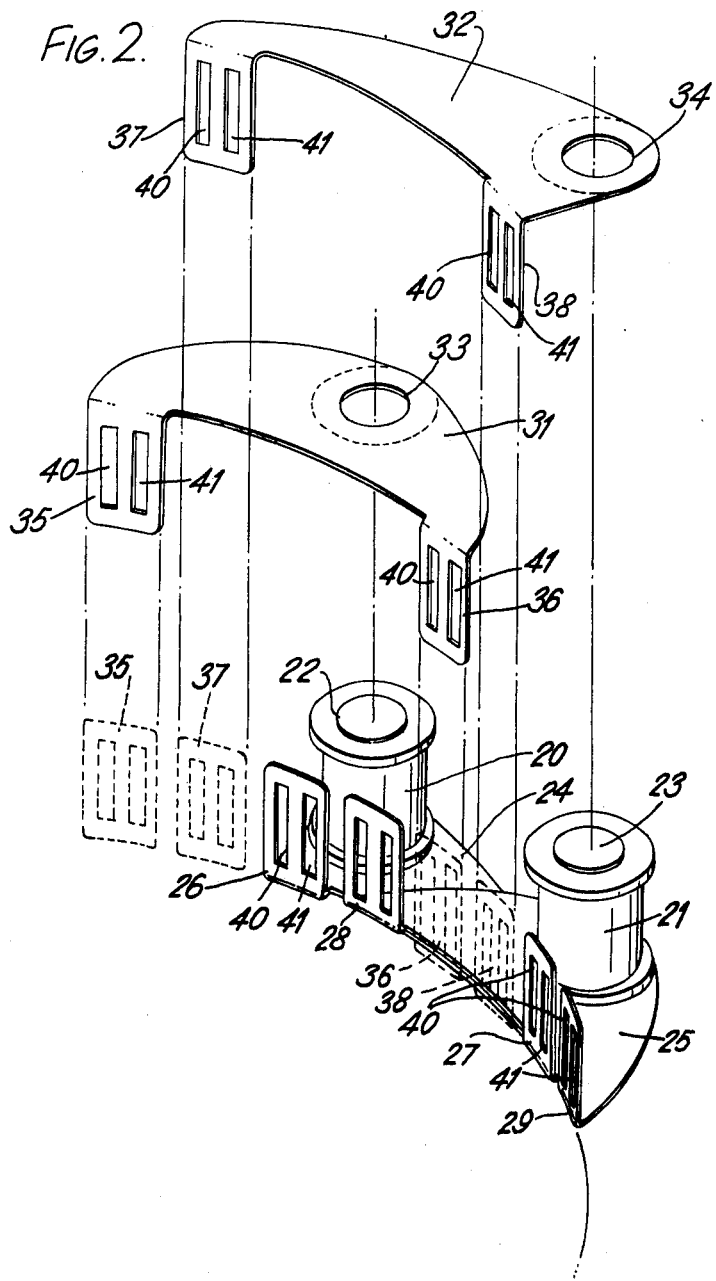

ELECTRIC MOTOR

This is a continuation, of application Ser. No. 601,438 filed Aug. 1, 1975 now abandoned.

This invention relates to an electric motor which can be driven by alternating current.

The invention has particular, though not exclusive, application to a motor which can be operated directly from the alternating current mains by power at a frequency of 50 Hz or 60 Hz to drive loads directly, i.e. without the use of reduction gears of any kind. Such a motor is particularly suitable for use in driving a gramophone, a tape recorder or an electrical instrument. The motors generally used for these purposes operate at speeds which are much higher than the final rotational speed required. Motor speeds of 1500 r.p.m. and 3000 r.p.m. are common, although special instrument motors of the "clock" type can run at speeds as low as 250 r.p.m. Thus to achieve final rotational speeds of e.g. 1 to 50 r.p.m., it is common practice to use gear chains, belts and pulleys, or planetary friction drives.

The motor of the present invention employs both reluctance motor and induction motor principles, the induction effect giving a good starting torque and the reluctance effect giving good torque when the motor is locked-in and running synchronously.

The principles upon which the invention is based, together with embodiments of motors employing the principles will now be described with reference to the accompanying drawings in which FIG. 1 is a diagrammatic sketch of a vertical section through a part of a rotor and a stator section and FIG. 2 is an exploded perspective view of a stator assembly.

Referring to FIG. 1, there is shown a section through a portion of a rotor ring 1 having upstanding teeth 2 which is used for driving a gramophone turntable. Supported above the rotor 1 (by means not shown) is a stator section 3. The section 3 is one of a number of such sections arranged around and above the ring 1. The section 3 has a width corresponding to that of the toothed part of the ring 1 and a length, in the particular embodiment, of 1¼. The stator section 3 has four pole pieces 4 to 7. The pole pieces 4 and 6 are wound with coils 8 and 9 which carry an "in-phase" current and the pole pieces 5 and 7 are wound with coils 11 and 12 which carry a "quadrature" current. The pole pieces 4 to 7 are each provided with teeth 13 of the same dimensions and pitch as the teeth 2 on the rotor ring 1 and it will be seen that the teeth 13 of the pole pieces 4 and 6 are immediately opposite to teeth 2 of the rotor ring 1 when the teeth 13 of the pole pieces 5 and 7 are opposite to the spaces between the teeth 2.

The pole pieces 4 to 7 contribute to the two phase induction motor effect, a minimum of two poles per phase being required, with the phases arranged alternately. Superimposed on these major poles are poles which are provided by the teeth 13 and which contribute to the reluctance motor effect, in conjunction with similar poles provided by the teeth 2 on the rotor 1. It will be remembered that the poles provided by the teeth 13 on the quadrature phase pole pieces 5 and 7 are offset with respect to those on the "in-phase" pole pieces 4 and 6, the poles provided by the teeth 13 on the "quadrature" phase pole pieces 5 and 7 being off-set with respect to the poles provided by the teeth 13 on the "in-phase" pole pieces 4 and 6 such that those of the "quadrature" phase are in pitch with the spaces or slots of the "in-phase" phase.

The stator and the rotor must each be of a material that enables desired currents to be induced in the rotor in order to give the required induction motor effect. However, the materials must also be such that the poles 2 and 13 can be clearly identified, in order to give the required reluctance effects. Thus the rotor must have a ferromagnetic component and sufficiently good electrical conductivity that currents can be induced in it for the induction motor effects. If the conductivity is too high, the induced currents could be so large that an excess of induction torque would be generated.

Synchronous speed is governed by the spacing of the reluctance poles 13 on the stator and the poles 2 on the rotor and the frequency of the drive current applied to the coils 8, 9, 11 and 12. A sine wave exhibits two peaks (one negative and one positive) in each cycle. Thus, the rotor must have poles such that two poles pass a given point during each cycle. The number of poles required on the rotor to produce a given synchronous speed for a given drive frequency may be calculated thus.

$$\text{Number of poles} = \frac{2 \times \text{frequency}}{\frac{\text{revolutions}}{\text{sec}}} \text{ (i.e. number of peaks)}$$

Thus for example 33⅓ rpm = $\frac{100}{180}$ rps and drive current at 50 Hz.

Therefore

No. of Poles = $20 \times 50 \times \frac{180}{100} = 180$ or taking 45 rpm = $\frac{45}{60}$ rps and drive current at 50 Hz No. of Poles = $2 \times 50 \times \frac{60}{45} = 133.3$ or 133 say.

A part of a stator assembly, which is particularly suitable for use in motors in accordance with the present invention will now be described with reference to FIG. 2, which shows an "in-phase" coil 20 and a "quadrature" coil 21 wound upon respective cores 22 and 23. To the lower face of the core 22, there is connected a part 24 and to the lower face of the core 23 there is connected a part 25. The part 24 has two bent-over portions 26 and 27, each of which acts as an induction pole piece and the part 25 has two bent-over portions 28 and 29, each of which acts as an induction pole piece. Parts 31 and 32, which are respectively similar to the parts 25 and 24, but are arranged inverted, are shown, for clarity, raised above the cores 22 and 23 to which they are in fact connected when assembled; the cores 22 and 23 fitting in respective holes 33 and 34 in the parts 31 and 32. When assembled, bent-over portions 35 and 36 of the part 31 and bent-over portions 37 and 38 of the part 32 occupy the positions indicated by the corresponding dotted outlines to act as induction pole pieces.

An array of induction poles is thus provided, with the pole pieces 35, 26, 36 and 27 associated with "in-phase" coil 20 being alternated with the pole pieces 37, 28, 38 and 29 associated with the "quadrature" coil 21. In each of the pole pieces 35, 37, 26, 28, 36, 38, 27 and 29 there are two slots 40 and 41 which define the more closely spaced poles providing the reluctance motor effect.

It will be appreciated that, although the stator assembly described with reference to FIG. 2 is only one of many possible constructions providing the same effect, it has the advantage that it can be constructed from a minimum number of parts, namely two piece parts such as 24 and 25 and a coil and core assembly such as 20, 22.

It will also be appreciated that the rotor can be made in one of a number of ways, for example it can be a ring, as described, a cylinder or a disc of iron or steel or other ferromagnetic material upon whose surface a pattern of poles is imprinted. The pattern should be such as to present a variable reluctance effect to a suitably designed stator. The pattern of poles can be established by producing slots or saliences on the surface of the rotor and these can be formed by e.g. milling, sawing, embossing, engraving, casting, stamping, pressing or the application of a suitably shaped body.

In the design shown in FIG. 1, the poles are formed on the adjacent horizontal surfaces of both the rotor and the stator, while in that shown in FIG. 2 the poles shown are formed on a vertical surface of a stator. It is, of course possible to combine these features and to have poles on both a vertical surface and a horizontal surface or even on two vertical surfaces and one horizontal surface or two horizontal surfaces and one vertical surface of both the stator and the rotor, the stator being a U or an inverted U-shape in cross-section, or a C or backward facing C-shape in cross-section and the rotor moving in the space between the vertical arms of the U or the horizontal arms of the C.

It will be appreciated that the illustration of the embodiment shown in FIG. 1 is diagrammatic and that the rotor and stator could in practice be in the form of discs arranged one above the other, in which case the rotor and stator slots would be tapered, or they could be in-line, so that the device operates as a rim-type motor, in which case the rotor slots would be parallel to the axis of rotation of the rotor and on its circumferential edge.

Although the stator section shown in FIG. 1 is arcuate and extends around only a part of the rim of the motor, it is possible for it to extend around the whole circumference of the rotor or for there to be a plurality of stator sections. It will be understood that an increase in the length of the stator increases the motor torque.

It will also be appreciated that although the invention has been described in its application to a two phase motor with 90 electrical degrees between the phases, it can be applied to motors having more than two phases.

Thus in the arrangement described with reference to FIG. 1, the teeth 13 of the pole pieces 4 and 6 are opposite to the teeth 2 of the rotor ring 1 when the teeth 13 of the pole pieces 5 and 7 are opposite to the spaces between the teeth 2.

In an arrangement employing other than a two phase electrical motor with 90 electrical degrees between the phases, the teeth 13 of the pole pieces 5 and 7 are displaced with respect to the teeth 2 according to the phase angle between the currents in the coils when the teeth 13 on the pole pieces 4 and 6 are opposite to the teeth 2, in order to give the required speed control.

The rotor poles can conveniently be a suitable ferromagnetic material supported on a sheet of insulating material and be formed, for example by an etching technique.

We claim:

1. An electric motor for operation by an alternating current, the motor including a stator assembly and a rotor, the stator assembly including a first plurality of primary pole pieces for energisation by an in-phase current, respective pairs of the said first plurality of primary pole pieces being each constituted by a respective first metal part having an extending surface and first and second bent over portions separated from each other to each define a pole piece, a second plurality of primary pole pieces for energisation by an out-of-phase current, respective pairs of the said second plurality of primary pole pieces being each constituted by a respective second metal part having an extending surface and third and fourth bent over portions separated from each other to each define a pole piece, the separated pole pieces of the pairs of the first plurality being arranged alternately with the separated pole pieces of the pairs of the second plurality, each bent over portion defining slots extending parallel to the axis of rotation of the rotor and constituting a plurality of secondary pole pieces associated with each primary pole piece and the rotor having a plurality of further pole pieces, the pitch of the further pole pieces corresponding to the pitch of the secondary pole pieces and the arrangement of the secondary and further pole pieces being such that when the secondary pole pieces associated with the first plurality of pole pieces are opposite to respective ones of the further pole pieces the secondary pole pieces associated with the second plurality of pole pieces are displaced with respect to respective ones of the further pole pieces according to the phase angle between the in-phase and out-of-phase currents.

2. An electric motor as claimed in claim 1 in which the number of further pole pieces is determined by the formula $$N = \frac{2 \times \text{frequency}}{\frac{\text{revolutions}}{\text{sec}}}$$

where N is the number of poles, frequency is the frequency of a supply voltage in cycles per second and the number of revolutions per second is defined by the required speed of rotation.

3. An electric motor as claimed in claim 1 including members defining slots which constitute the secondary pole pieces.

4. An electric motor as claimed in claim 2 including a rotor in the form of an annular ring.

5. An electric motor as claimed in claim 1 including a rotor and a stator having further pole pieces and secondary pole pieces respectively on adjacent horizontal surfaces.

6. An electric motor as claimed in claim 1 including a stator having secondary pole pieces on a normally vertical surface parallel to the axis of rotation of the rotor.

* * * * *